Figure 1:
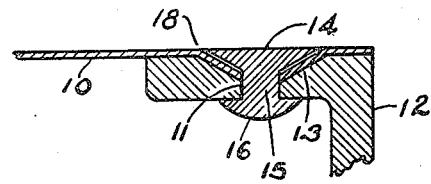
Figure 2:
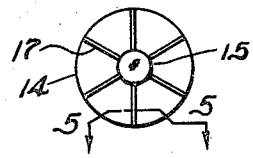
Figure 3:
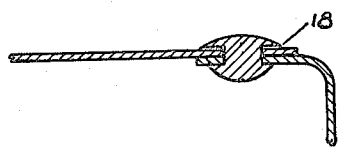
Figure 4:
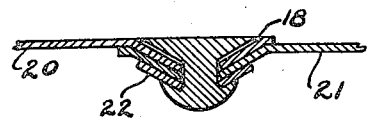
Figure 5:
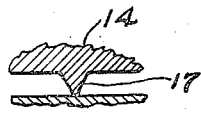
Figure 6:
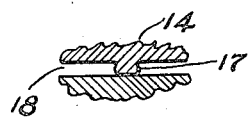

Oct. 3, 1939.  F. M. YOUNG  2,174,678

RIVET AND METHOD OF MAKING RIVETED JOINTS

Filed Feb. 3, 1937

INVENTOR
FRED M. YOUNG
By A.S. Krotz
Attorney

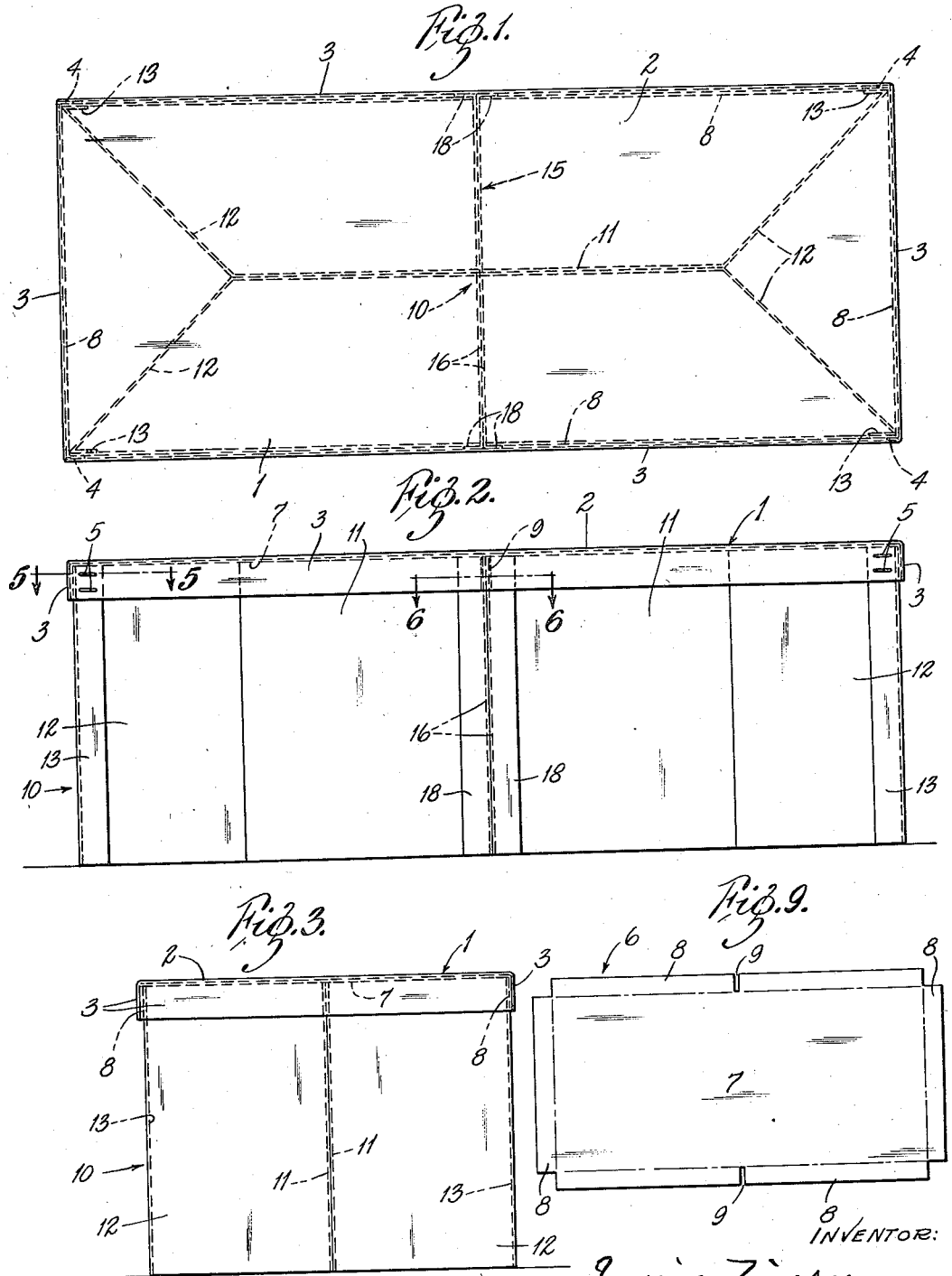
Oct. 3, 1939.                I. ZINSER                2,174,679
                         COLLAPSIBLE TABLE
                         Filed Nov. 4, 1938        2 Sheets-Sheet 1